Sept. 23, 1930.  W. I. BALLENTINE ET AL  1,776,408
HITCH MECHANISM FOR TRACTORS
Original Filed June 16, 1923  2 Sheets-Sheet 1
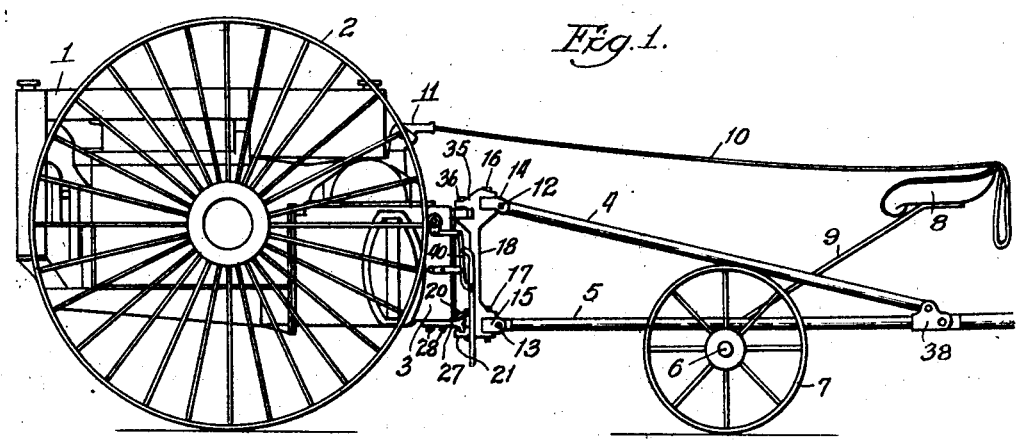
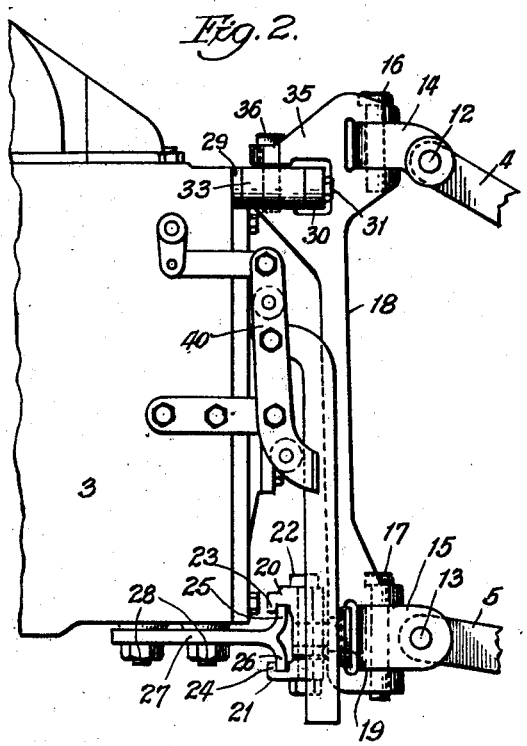
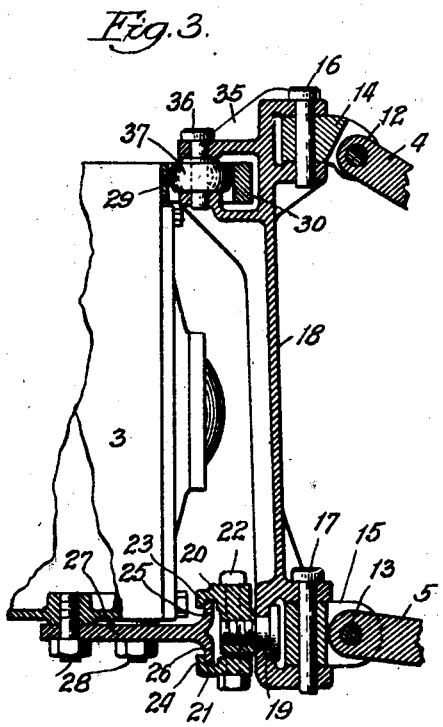
Inventors:
William I. Ballentine
& Paul R. Thompson,
By Wallace R. Lane.
Atty.

Sept. 23, 1930.    W. I. BALLENTINE ET AL    1,776,408
HITCH MECHANISM FOR TRACTORS
Original Filed June 16, 1923    2 Sheets-Sheet 2
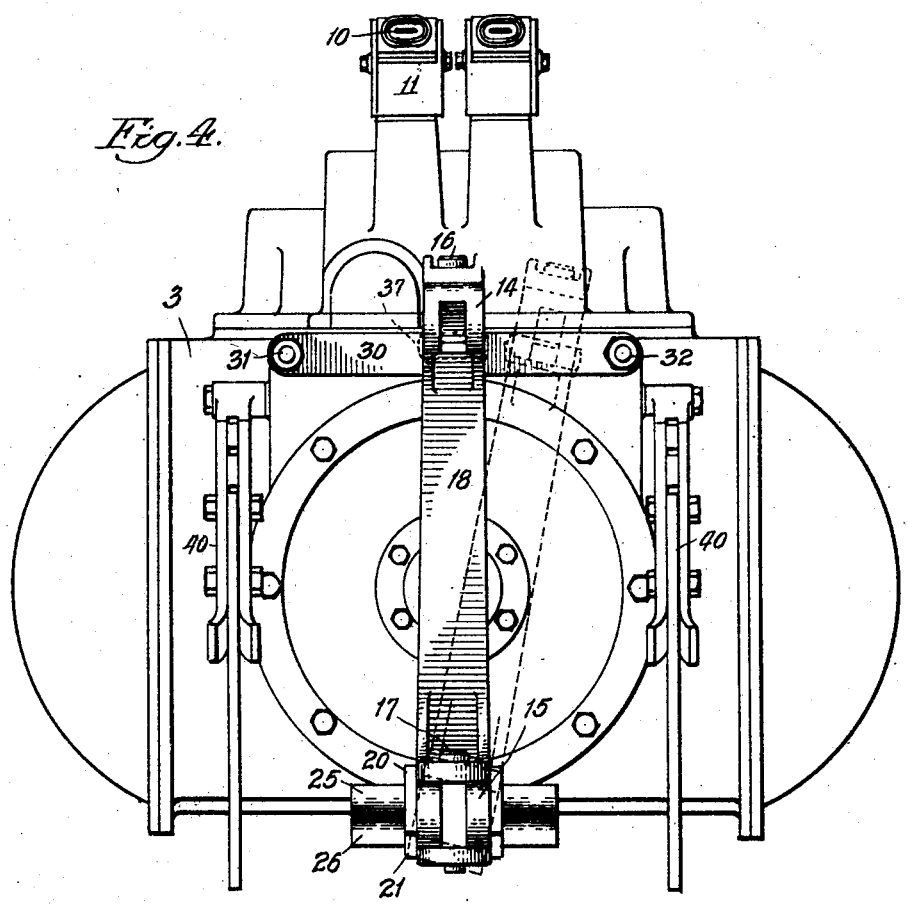
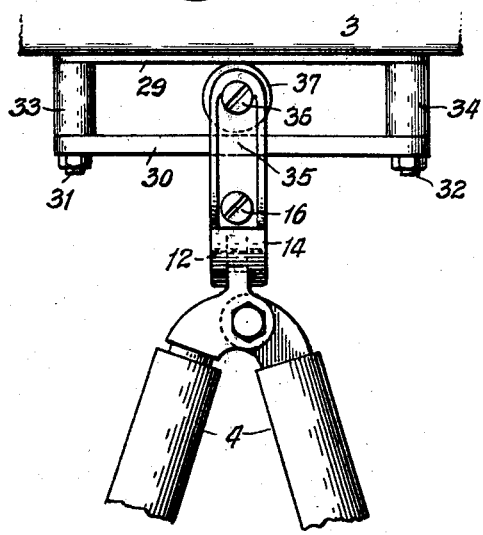
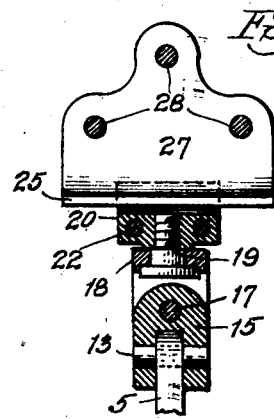
Inventors:
William I. Ballentine
& Paul R. Thompson,
by Wallace R. Lane.
Atty.

Patented Sept. 23, 1930

1,776,408

UNITED STATES PATENT OFFICE

WILLIAM I. BALLENTINE AND PAUL R. THOMPSON, OF LA PORTE, INDIANA, ASSIGNORS TO ADVANCE-RUMELY COMPANY, OF LA PORTE, INDIANA, A CORPORATION OF INDIANA

HITCH MECHANISM FOR TRACTORS

Original application filed June 16, 1923, Serial No. 645,751. Divided and this application filed June 25, 1923. Serial No. 647,609.

The present invention relates to hitches, such as those used in connecting a tractor to an agricultural implement moved by the tractor, it being understood that the terms "move" and "moved" as herein used are generic to pushing or driving and pulling or drawing the implement.

This is a division of copending application Serial No. 645,751, filed June 16, 1923.

Among the objects of the invention are to provide a novel hitch which may be readily and adjustably connected to the tractor at any given position laterally with respect to the central line of travel of the tractor or centrally thereof, when it is desired to have the implement run along side rows of plants or side furrows or centrally over central furrows or rows of plants over which the tractor may be driving; to provide such hitch with means for permitting the rolling of the implement as it rides over the irregular surface or contour of the ground; to provide the hitch with a hitch bar, preferably in the form of an upright member, having an end thereof preferably pivotally connected to the tractor and its other end free to move laterally to permit the rolling action of the implement and the reach connecting the implement to the hitch bar; to provide the hitch with a race-way means for permitting such free lateral movement of the hitch bar; to provide the hitch with means for permitting relative angular movement between the tractor and the hitch about an axis, preferably a horizontal axis, and between the hitch and the implement about an axis transverse to the first mentioned axis, such as a vertical axis; to provide a lateral adjusting means with preferably a clamp slidably connected to a cross member fastened to the tractor and also preferably pivotally connecting the hitch bar to the clamp for rolling action of the implement; to provide for adjusting the reach between the hitch and the implement for varying its height with respect to the hitch; and such further objects, advantages, and capabilities as will later more fully appear and are inherently possessed by the invention.

In the drawings illustrating a preferred embodiment of the invention, Fig. 1 is a side elevation of a tractor and drawn implement connected by a hitch constructed in accordance with the invention; Fig. 2 is a side view of the hitch; Fig. 3 is a similar view in vertical section; Fig. 4 is a rear view of the hitch and a tractor; Fig. 5 is a top plan view of the race-way portion of the hitch, and Fig. 6 is a horizontal sectional view of the pivotal connection between the hitch and the tractor mechanism.

Referring now more particularly to the drawings, the invention is shown as embodied in a tractor comprising a power plant 1, preferably of the internal combustion type, supported upon a pair of bull wheels 2 rotatably mounted at the outer ends of a pair of axle housings rigidly fastened or secured to the sides of the engine frame or block by any suitable means. At the rear end of the engine 1 is rigidly attached a housing 3 within which is located the power transmitting means and the control therefor, for the driving of the wheels 2. At the rear end of the housing 3 is attached a hitch mechanism to which are connected the reaches 4 and 5 of a drawn implement suitably supported upon an axle 6 and wheels 7. A seat for the driver may be supported by any suitable means 9 fastened to the drawn implement. A pair of reins 10 extend from the mechanism in the housing 3 through a pair of rein guides 11 to the seat 8 where the reins may be manually operated by the driver or operator sitting on a seat.

Referring to the hitch mechanism, the forward ends of the reaches 4 and 5 are pivotally connected by means of pivots 12 and 13 to members 14 and 15 which are in turn pivotally connected to vertical pivots 16 and 17 mounted in the upper and lower end respectively of a hitch bar 18. The lower end of the bar 18 is pivotally connected to a pivot bolt 19 suitably threaded to fit tightly into a clamp member 20. The clamp member 20 together with a clamp member 21 and a clamping bolt 22 passing through both clamp members, constitute a clamp means by which the lower end of the hitch bar may be adjustably connected, laterally, to the tractor. Both clamp members 20 and 21 have clamping flanges 23 and 24 adapted to fit over the upper and lower rail flanges 25 and 26 of a T-shape rail or cross member 27 securely fastened to the bottom of the housing 3, at the rear end thereof, by means of suitable bolts 28, as clearly shown in Fig. 3 of the drawings. The clamp means may be adjusted transversely of the tractor and along the head of flanges 25 and 26 of the cross rail in order to locate the lower end of the hitch bar 18 at any desired position transversely of the line of travel of the tractor. This adjustment may be made where it is desired to drive the agricultural implement along a row of plants or furrows which do not lie centrally of the tractor, as to one side thereof, or along rows or furrows which lie centrally of the tractor, the clamp being adjusted, for the latter, to central position, as clearly shown in Figs. 4 and 5 of the drawings. The adjustment of the clamp means is made by loosening the bolt 22 and then tightening it again when the desired adjusted position is attained.

At the rear upper part of the housing 3 are attached a pair of spaced race plates 29 and 30 by means of bolts 31 and 32 and spacers 33 and 34, the latter being of utility to hold the plates in spaced relation so as to permit the movement therebetween of a roller 37. The upper end of the bar 18 has a forwardly extending portion 35 carrying a pivot pin 36 upon which is rotatably mounted a roller 37, the latter being adapted to ride or play between the race plates 29 and 30, as clearly shown in Figs. 3, 4, and 5 of the drawings. Inasmuch as the roller 37 is carried by the upper end of the hitch bar 18 which is capable of angular motion about the axis of the pivot stud 19, the roller 37 may ride in an arc path over the inner surfaces of the plates 29 and 30, the latter being of a sufficient width to permit a free riding over such surfaces at all times without danger of the roller riding off of the edges of the plates. This movement will permit the driven implement and the reaches connected to it to have a rolling or rocking action substantially about a horizontal axis as the driven implement rides over irregular surfaces or contours of the ground.

At the rear end of the reaches 4 may be pivotally connected one or more clamps 38 which are adjustably slidable on the lower reaches 5, the clamp 38 being capable of being tightened in any adjustable position along the reaches 5 as desired. This adjustment may be made when it is desired to raise or lower the position of the implement with respect to the hitch. It will be apparent that when the clamping member 38 is moved rearwardly along the reaches 5 the implement will have an upward adjustment with respect to the hitch, and when the clamping member 8 is moved forwardly it will have a lowering adjustment.

The pivotal connections 16 and 17 between the reaches and the hitch bar 18 permit relative angular movement between the tractor and the drawn implement when going around a curve or turning a corner or for the purpose of steering. This angular movement is preferably transverse to the angular movement of the rolling action of the drawn implement about the axis of the stud 19. When turning corners or driving around a curve the driven implement may often times get into a cramped position with respect to the tractor, and in order to take care of this condition the tractor may also be provided with cramp preventing mechanism 40, more particularly described in the aforesaid copending application.

While we have herein described and shown upon the drawings a preferred embodiment of the invention, it is to be understood that the invention is not limited to the particular construction, details, and arrangement of parts shown and described, but that other constructions, details, and arrangements of parts are comprehended by the invention without departing from the spirit thereof.

Having now described our invention, we claim:

1. A hitch for connecting a tractor to an implement moved thereby, comprising a cross member connected to the tractor, an upright member connected to the implement, means adjustably connecting the members whereby the implement may ride laterally or centrally with respect to the center line of travel of the tractor, and a race-way means connecting an end of the upright member and the tractor whereby said end of the upright member may be free to move laterally.

2. A hitch for connecting a tractor to an implement moved thereby, comprising a cross member rigidly connected to the tractor, an upright member connected to the implement, means adjustably connecting the members whereby the implement may ride laterally or centrally with respect to the center line of travel of the tractor, said means comprising a free pivotal connection between the upright member and the cross member to permit automatic lateral swing of the upright member about said pivot.

3. A hitch for connecting a tractor to an implement moved thereby, comprising a cross member connected to the tractor, an upright member connected to the implement, means adjustably connecting the members whereby the implement may ride laterally or centrally with respect to the central line of travel of the tractor, said means comprising a pivotal connection between the lower end of the upright member and the cross member and means on the tractor and located at the upper end of the upright member for permitting free lateral movement thereof.

4. A hitch for connecting a tractor to an implement moved thereby, comprising a cross member connected to the tractor, an upright member connected to the implement, means adjustably connecting the members whereby the implement may ride laterally or centrally with respect to the center line of travel of the tractor, a race-way connection between the tractor and the upper end of the upright member for permittting a free lateral movement thereof.

5. A hitch for connecting a tractor to an implement moved thereby, comprising a cross member fastened to an end of the tractor, a clamp adjustable along said cross member, and means on the clamp for causing it to grip said cross member at any selected point thereof, an upright member pivotally connected to the clamp, and means connecting the upright member to the implement.

6. A hitch for connecting a tractor to an implement moved thereby, comprising a cross member fastened to an end of the tractor, a clamp adjustable along of and adjustably secured to said cross member, an upright member pivotally connected at an end thereof to the clamp and slidably connected at the other end thereof to the tractor whereby the upright member may have free lateral swinging movement, and means connecting the upright member to the implement.

7. A hitch for connecting a tractor to an implement moved thereby, comprising a cross member fastened to an end of the tractor, a clamp adjustable along of and adjustably secured to said cross member, an upright member pivotally connected at an end thereof to the clamp, a race-way on the tractor for the movement therein of the other end of the upright member whereby the upright member may have lateral swinging movement, and means connecting the upright member to the implement.

8. A hitch for connecting a tractor to an implement moved thereby, comprising a cross member fastened to an end of the tractor, a clamp adjustable along of and adjustably secured to said cross member, an upright member pivotally connected at an end thereof to the clamp, spaced race-way plates on the tractor, a race roller on the other end of said upright member and movable between said plates whereby the upright member may have lateral swinging movement, and means connecting the upright member to the implement.

9. A hitch for connecting a tractor to an implement moved thereby, comprising a cross member rigidly fastened to an end of the tractor, a clamp adjustable along said cross member, means carried by the clamp for causing the latter to grip said cross member at any selective point thereof, means pivotally connected to the clamp for relative angular movement of said means and the tractor about a horizontal axis, and means pivotally connected to the upper and lower ends of said first means and to the implement for angular movement of the implement about an upright axis.

10. A hitch for connecting a tractor to an implement moved thereby, comprising a hitch bar, means for connecting said bar in any one of several positions transversely of the length of the tractor, means for permitting the bar to have a free automatic lateral rocking movement, means for pivotally connecting the implement to the bar, and means for adjusting the height of the implement with respect to the bar.

11. A hitch for connecting a tractor to an implement moved thereby, comprising an upright member, reaches connected to said member, and means on the tractor for supporting the upright member for free automatic swinging movement thereof and the reaches transversely of the line of travel of the tractor, said means having a pivotal connection with an end of the upright member.

12. A hitch for connecting a tractor to an implement moved thereby, comprising an upright member, reaches connected to said member, and means on the tractor for supporting the upright member for swinging movement thereof and the reaches transversely of the line of travel of the tractor, said means having a race-way within which an end portion of said upright travels during its automatic swinging action.

13. A hitch for connecting a tractor to an implement moved thereby, comprising an upright member, reaches connected to said member, a pivotal connection between the lower end of said member and the tractor and means on the tractor and cooperating with the upper end of the upright member to confine the movement of said member transversely of the line of travel of the tractor.

14. A hitch for connecting a tractor to an implement moved thereby, comprising an upright member, reaches connected to said member, a pivotal connection between the lower end of said member and the tractor, and a race-way on the tractor and for the transverse travel of the upper end of the upright member therein.

15. In devices for connecting a tractor to an implement to be moved thereby, means for providing relative bodily lateral shifting of the implement and tractor, said means comprising a two-point supported arm, a gripping clamp at one point of support of the arm and secured to a part of the tractor, a race-way at the other point of support of the arm and carried by the tractor, said arm at said other point of support being freely movable along the race-way for swinging movements to permit relative rocking of the tractor and implement when moving over surfaces of irregular contour, and means for connecting the arm to the implement.

16. In devices for connecting a tractor to an implement to be moved thereby, means for providing relative bodily lateral shifting of the implement and tractor, said means comprising a two-point supported arm, a gripping clamp at one point of support of the arm and secured to a part of the tractor, a raceway at the other point of support of the arm and carried by the tractor, said arm at said other point of support including a roller having rolling contact with the race-way for angular movement of the arm to permit relative rocking of the tractor and implement when moving over surfaces of irregular contour, and means for connecting the arm to the implement.

17. A hitch for connecting a tractor to an implement moved thereby, comprising a member rigidly connected to the tractor, a member connected to the implement, and clamping means slidably connected to said first member, said clamping means having means for fixing the clamping means at any slid position.

18. A hitch for connecting a tractor and an implement moved thereby, comprising a cross member rigidly secured to the tractor, an upright member connected at one end thereof to the tractor and at the other end thereof to the implement, means adjustably connecting the members together for lateral or central riding of the implement relative to the center line of travel of the tractor, said adjustable means including means for permitting lateral swinging of the upright member and connected implement.

In witness whereof, we hereunto subscribe our names to this specification.

WILLIAM I. BALLENTINE.
PAUL R. THOMPSON.